United States Patent [19]

Chang et al.

[11] Patent Number: 4,501,872
[45] Date of Patent: * Feb. 26, 1985

[54] MOISTURE CURABLE COMPOSITIONS CONTAINING REACTION PRODUCTS OF HYDROPHOBIC POLYOLS AND ORGANOSILICON-CONTAINING MATERIALS

[75] Inventors: Wen-Hsuan Chang; David T. McKeough, both of Gibsonia; John R. Peffer, Pittsburgh, all of Pa.

[73] Assignee: PPG Industries, Inc., Pittsburgh, Pa.

[*] Notice: The portion of the term of this patent subsequent to Aug. 21, 2001 has been disclaimed.

[21] Appl. No.: 462,573

[22] Filed: Jan. 31, 1983

[51] Int. Cl.$^3$ .................. C08G 77/06; C08G 77/04
[52] U.S. Cl. .................. 528/18; 524/100; 524/783; 524/859; 525/7.2; 528/19; 528/26; 528/28; 528/29; 528/34
[58] Field of Search .................. 528/18, 26, 19, 28, 528/29, 34; 525/7.2; 524/100, 783, 859

[56] References Cited

U.S. PATENT DOCUMENTS

| | | | |
|---|---|---|---|
| 2,048,799 | 7/1936 | Lawson | 260/96 |
| 2,630,446 | 3/1953 | Gresham | 260/448.8 |
| 2,877,202 | 3/1959 | Olson | 260/45.4 |
| 2,911,386 | 11/1959 | Olson et al. | 260/46.5 |
| 2,917,467 | 12/1959 | Olson et al. | 260/2 |
| 3,150,116 | 9/1964 | Masters | 260/47 |
| 3,154,597 | 10/1964 | McWhorter | 260/824 |
| 3,388,101 | 6/1968 | Wismer et al. | 260/77.5 |
| 3,429,851 | 2/1969 | Coates et al. | 260/46.5 |
| 3,539,658 | 11/1970 | Sekmakas et al. | 260/827 |
| 3,624,014 | 11/1971 | Moore et al. | 260/18 S |
| 3,917,648 | 11/1975 | McLeod | 260/32.8 SB |
| 3,932,339 | 1/1976 | McLeod | 260/32.8 SB |
| 3,997,485 | 12/1976 | Dowbenko et al. | 525/7.2 |
| 3,997,501 | 12/1976 | McLeod | 260/37 SB |
| 4,013,698 | 3/1977 | Lohse et al. | 260/448.8 R |
| 4,069,178 | 1/1978 | Mikami et al. | 260/22 S |
| 4,093,673 | 6/1978 | Chang et al. | 260/824 EP |
| 4,113,665 | 9/1978 | Law et al. | 528/34 |
| 4,218,354 | 8/1980 | Hayati et al. | 528/494 |
| 4,243,767 | 1/1981 | Kaufman et al. | 525/102 |
| 4,302,571 | 11/1981 | Arai et al. | 528/32 |
| 4,413,086 | 11/1983 | Chang et al. | 525/480 |

Primary Examiner—Herbert J. Lilling
Attorney, Agent, or Firm—Thomas M. Breininger

[57] ABSTRACT

Disclosed is a liquid composition comprising a homogeneous reaction product of a hydrophobic polyol and an organosilicon-containing material. The organosilicon-containing material comprises an organosilicon-containing substance free of functional groups attached to carbon and essentially free of alkali metal ions, having atoms bonded directly to silicon, all of which atoms are selected from O, N, and/or Cl. The organosilicon-containing substance additionally has moieties directly bonded to silicon which are displaceable by reaction with water and/or alcohol. At least a part of the organosilicon-containing substance is hydrolyzed to a compound or a mixture of compounds containing a residual amount of the moieties directly bonded to silicon which are displaceable.

The reaction product is not capable of being gelled according to a specific three-step gel test; has a ratio of milliequivalents of the residual displaceable moieties to milliequivalents of hydroxyl moieties from the polyol greater than 1, and is capable of self-curing to a continuous film in the presence of moisture.

18 Claims, No Drawings

MOISTURE CURABLE COMPOSITIONS CONTAINING REACTION PRODUCTS OF HYDROPHOBIC POLYOLS AND ORGANOSILICON-CONTAINING MATERIALS

BACKGROUND OF THE INVENTION

Given the increasing costs and scarcity of petroleum based energy sources and concern over the possible harmful effects of high concentrations of various volatile organic solvents in the environment, there has arisen a need in the coatings industry for coating compositions which contain ever lower concentrations of volatile organic components and which are based to an ever decreasing degree on expensive petroleum based components.

However, previous approaches to meet both of the above challenges generally have involved compromises among desirable coating composition properties such as molecular weight of the principal film forming resin, application viscosity of the composition, low curing temperature, and desirable properties of the cured film such as water resistance, flexibility, hardness, solvent resistance, etc.

It would be desirable to produce coating materials which contain low levels of organic solvents, cure at low temperatures, have low application viscosities, do not generate highly toxic volatile materials upon curing, contain less petroleum based components, and yet cure to produce films having desirable features at least as good as conventional, cured films.

SUMMARY OF THE PRESENT INVENTION

A liquid composition of the present invention comprises a reaction product prepared by at least partially reacting a hydrophobic polyol and an organosilicon-containing material comprising an organosilicon-containing substance having atoms bonded directly to Si all atoms of which are selected from the group consisting of oxygen, nitrogen, and/or chlorine. The organosilicon-containing substance also has moieties directly bonded to Si which are displaceable by reaction with water and/or alcohol. At least a part of the organosilicon-containing substance is hydrolyzed. Generally, such hydrolyzed organosilicon-containing substances will be at least partially condensed to a compound or mixture of compounds containing at least one siloxane linkage per molecule and containing a residual amount of the moieties directly bonded to silicon which are displaceable by reaction with water and/or alcohol.

The reaction product of the organosilicon-containing material and hydrophobic polyol is ungelled, is homogeneous and contains residual moieties from the organosilicon-containing material which are directly bonded to Si and are displaceable. The reaction product has a ratio of milliequivalents of the residual displaceable moieties from the organosilicon-containing material to milliequivalents of residual hydroxyl moieties from the hydrophobic polyol which is greater than 1. The reaction product can be self-cured in the presence of moisture, typically in the presence of a catalyst, to a continuous film.

DETAILED DESCRIPTION OF THE INVENTION

A liquid composition of the present invention comprises a reaction product prepared by reacting:

(A) at least one hydrophobic polyol; and
(B) an organosilicon-containing material comprising
 (1) at least one organosilicon-containing substance free of functional groups attached to carbon and essentially free of alkali metal ions, having atoms bonded directly to Si, all of which atoms are selected from the group consisting of O, N, and/or Cl, the organosilicon-containing substance additionally having moieties directly bonded to Si which are displaceable by reaction with water and/or alcohol, wherein at least a part of the organosilicon-containing substance is hydrolyzed to a compound or a mixture of compounds containing a residual amount of the moieties directly bonded to silicon which are displaceable by reaction with water and/or alcohol;
 (2) optionally a nonfunctional organosilane, a hydrolyzed nonfunctional organosilane, or a mixture thereof; and
 (3) optionally a functional organosilane, a hydrolyzed functional organosilane, or a mixture thereof;

wherein the reaction product is not capable of being gelled according to a specific three-step gel test described infra, has a ratio of milliequivalents of residual moieties from the organosilicon-containing material which are displaceable by reaction with water and/or alcohol to milliequivalents of hydroxyl moieties from the hydrophobic polyol which is greater than 1, and is capable of self-curing to a continuous film in the presence of moisture and optionally in the presence of a catalyst. The homogeneous, ungelled reaction product preferably has a low volatility. The homogeneous reaction product generally has a low content of residual hydroxyl moieties from the hydrophobic polyol. Typically the reaction product has a content of hydroxyl moieties from the polyol ranging from 0 milliequivalents per gram to 6 milliequivalents per gram based on the weight of the reaction product. Often the reaction is carried out essentially to completion with respect to the hydroxyl moieties from the hydrophobic polyol. When the reaction is carried out essentially to completion, the reaction product can be characterized as being "substantially hydroxyl free" and typically has a residual hydroxyl content of less than about 0.5 milliequivalents per gram.

Polycarbinols (herein referred to for convenience simply as "polyols") suitable for preparing the reaction product are hydrophobic polyols typically having a hydroxyl equivalent weight of from 45 to 1000, preferably of from 59 to 600. Typically the hydroxyl equivalent weight of polyols used to prepare reaction products suitable for high solids coating compositions ranges from 59 to 500, preferably from 70 to 300. Diols are preferred for the hydrophobic polyol component for preparing the reaction products. The polyols typically are free of ethylenic unsaturation, typically contain at least 4 carbon atoms, typically are essentially free of phenolic hydroxyl moieties, and typically are essentially free of expoxy moieties such as diepoxide moieties for example. Preferably, at least a part of the polyol contains nonvicinal hydroxyl groups, that is, hydroxyl groups which are bonded to carbon atoms which are separated from each other by at least 1 intervening carbon atom. A large amount of high molecular weight 1,2-glycols generally is undesirable in polyols used to prepare the reaction products since the high molecular weight 1,2-glycols are believed to contribute to the formation of a high yield of cyclic moieties in the reaction products prepared therefrom thereby decreasing the number of reactive functional groups in the resins and thereby lessening the cure response of the reaction products. A large amount of low molecular weight 1,2-glycols, such as ethylene glycol, also is undesirable since such glycols tend to volatilize during cure and therefore prevent the formation of a continuous, water resistant film if no hydrophobic polyol is present in the resin. Additionally, polyols containing hydroxyl moieties separated from each other by only three carbon atoms are also undesirable for similar reasons. However, an amount of such diol moieties insufficient to adversely affect the cure response and properties of the cured film can be employed in the reaction products and sometimes may even be desirable.

The term "hydrophobic polyol" is intended to mean a polyol having limited compatibility with water as determined by the following procedure. Thirty parts by weight of polyol and 70 parts by weight of water are thoroughly mixed together at 80° Celsius (°C.) for 5 minutes. Upon cooling to room temperature, if the polyol/water mixture separates into two phases, the polyol is considered herein to be a hydrophobic polyol useful for the preparation of resins of the invention. Polyols such as ethylene glycol when mixed with water according to the above procedure for determining hydrophobic polyols produce a homogeneous (i.e. single phase) mixture and are considered herein to be hydrophilic. Pure hydrophilic polyols are not desirable for preparation of the reaction products because the resultant reaction product will tend to disadvantageously degrade either during curing or as a cured film either by evaporation or by hydrolysis to produce SiO$_2$. Thus, for example, such hydrophilic polyols often will not permit continuous films to be formed when resins prepared from such polyols are cured.

An advantage of using hydrophobic polyols in the preparation of the reaction products is that they enhance the hydrolytic stability of the oxygen to silicon bond

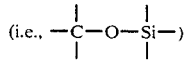

formed by the reaction of the hydroxyl moiety on the polyol with a reactive moiety on the organosilicon-containing material. Additionally, sterically hindering groups attached to carbon which is bonded through oxygen to silicon also are believed to contribute to hydrolytic stability of the oxygen to silicon bond. Hydrolytic stability of the aforementioned oxygen to silicon bond is believed to contribute to the resistance of cured coatings prepared from the reaction products to degradation by water either in the form of liquid water or water vapor. The organic portion of the reaction products surprisingly stays in cured films prepared from these reaction products. Additionally, cured coatings prepared from these reaction products generally have excellent humidity resistance. It is also believed that the utilization of hydrophobic polyols enables the reaction products to function as durable, protective film formers per se. This is to be contrasted with silicate-containing resins based on low molecular weight, highly volatile, hydrophilic polyols, for example, ethylene glycol, for which the organic portion essentially leaves the film when the resin is thermally cured. Thus a polyol, such as ethylene glycol, which is hydrophilic, has 1,2-glycol groups, is highly volatile, and can be considered to be a leaving group, represents a polyol having a combination of very undesirable properties which make the use of significant amounts of such polyol undesirable for making a reaction product of the present invention. A significant amount of ethylene glycol, for example, would represent more than 50 percent by weight of the polyol, component (A). However, less than 30 percent of a polyol such as ethylene glycol can be used in preparing a reaction product of the invention and may even be desirable to the extent that it represents a good leaving group on curing without contributing to undesirable properties in a resultant cured film prepared from the reaction product.

Examples of polyols useful in the preparation of the reaction products include the hydrophobic polyols in the broad classes including: simple diols, triols, and higher hydric alcohols; polyester polyols; polyether polyols; amide containing polyols; and polyurethane polyols.

The simple diols, triols, and higher hydric alcohols useful in the preparation of the reaction products are generally known, examples of which include: 1,2-butanediol, 1,4-butanediol; 1,3-butanediol, 2,2,4-trimethyl-1,3-pentanediol; 1,5-pentanediol; 2,4-pentanediol; 1,6-hexanediol; 2,5-hexanediol; 2-methyl-1,3-pentanediol; 2-methyl-2,4-pentanediol; 2,4-heptanediol; 2-ethyl-1,3-hexanediol; 2,2-dimethyl-1,3-propanediol; 1,4-cyclohexanediol; 1,4-cyclohexanedimethanol; 1,2-bis(hydroxymethyl)cyclohexane; 1,2-bis(hydroxyethyl)cyclohexane, 2,2-dimethyl-3-hydroxypropyl-2,2-dimethyl-3-hydroxypropionate; dipropylene glycol; the alkoxylation product of 1 mole of 2,2-bis(4-hydroxyphenyl)propane (i.e., bisphenol-A) and 2 moles of propylene oxide available as DOW-565 from DOW Chemical Company; and the like. Of the above simple diols, triols, and higher hydric alcohols, less desirable are dipropylene glycol and 1,3 type diols such as 1,3-butanediol, 2,2,4-trimethyl-1,3-pentanediol, 2,4-pentanediol, 2-methyl-1,3-pentanediol, 2-methyl-2,4-pentanediol, 2,4-heptanediol, 2-ethyl-1,3-hexanediol, and 2,2-dimethyl-1,3-propanediol when employed as the sole polyol component because of the tendency of some of these diols to form cyclic moieties during reaction with the organosilicon-containing material and because some of these diols are on the borderline of being hydrophilic as determined by the test for hydrophobicity described above.

Hydrophobic polyester polyols useful in the preparation of the reaction products are generally known and are prepared by conventional techniques utilizing simple diols, triols and higher hydric alcohols known in the art including but not limited to the previously described simple diols, triols, and higher hydric alcohols (optionally in combination with monohydric alcohols) with polycarboxylic acids, optionally polycarboxylic acids essentially free of ethylenic unsaturation. As used herein, the phrase "polycarboxylic acids essentially free of ethylenic unsaturation" is intended to include acids containing aromatic unsaturation but essentially no ethylenic unsaturation. Examples of suitable polycarboxylic acids include: phthalic acid; isophthalic acid; terephthalic acid; trimellitic acid; tetrahydrophthalic acid, hexahydrophthalic acid; tetrachlorophthalic acid; adipic acid, azelaic acid, sebacic acid; succinic acid; malic acid; glutaric acid; malonic acid; pimelic acid;

suberic acid; 2,2-dimethylsuccinic acid; 3,3-dimethylglutaric acid; 2,2-dimethylglutaric acid; maleic acid, fumaric acid, itaconic acid; and the like. Anhydrides of the above acids, where they exist, can also be employed and are encompassed by the term "polycarboxylic acid". In addition, certain materials which react in a manner similar to acids to form polyester polyols are also useful. Such materials include lactones such as caprolactone, propylolactone and methyl caprolactone, and hydroxy acids such as hydroxycaproic acid and dimethylolpropionic acid. If a triol or higher hydric alcohol is used, a monocarboxylic acid, such as acetic acid and benzoic acid, may be used in the preparation of the polyester polyol, and for some purposes, such a polyester polyol may be desirable. Moreover, polyester polyols useful in the invention are understood to include polyester polyols modified with fatty acids or glyceride oils of fatty acids (i.e., conventional alkyd polyols containing such modification). However, such alkyd polyols are considered to be less desirable. A preferred way of making a polyester polyol suitable for the invention is to react an alkylene oxide such as ethylene oxide, propylene oxide, butylglycidyl ether, and the glycidyl esters of organic acids such as CARDURA-E, with the carboxylic acid to form the corresponding ester. By this method, there is essentially no vicinal hydroxyl groups in the resulting polyol product.

Examples of the optional monohydric alcohols which may be used to prepare the polyester polyols include: ethanol, propanol, isopropanol, n-pentanol; neopentyl alcohol; 2-ethoxyethanol; 2-methoxyethanol; 1-hexanol; cyclohexanol; 2-methyl-2-hexanol; 2-ethylhexyl alcohol; 1-octanol, 2-octanol, 1-nonanol; 5-butyl-5-nonanol, isodecyl alcohol, and the like. Usually, the hydrophobic properties of the resin can be enhanced by employing monoalcohols containing more than 4 carbon atoms.

Hydrophobic polyether polyols which may be used in the preparation of the reaction products are generally known. Examples of hydrophobic polyether polyols include the poly-(oxypropylene) glycols prepared by the acid or base catalyzed addition of propylene oxide to propylene glycol or dipropylene glycol initiators and by the copolymerization of propylene oxide and ethylene oxide with initiator compounds such as trimethylolpropane, glycerol, pentaerythritol, sorbitol, sucrose and the like. The hydrophobic polyether polyols also include the generally known poly(oxytetramethylene) glycols prepared by the polymerization of tetrahydrofuran in the presence of Lewis acid catalysts such as boron trifluoride, tin (IV) chloride, antimony pentachloride, antimonytrichloride, phosphorous pentafluoride, and sulfonyl chloride. Other examples of hydrophobic polyether polyols include the generally known reaction products of 1,2-epoxide-containing compounds with polyols such as those included in the description of simple diols, triols, and higher hydric alcohols above.

Hydrophobic amide-containing polyols are generally known and typically are prepared from any of the above-described diacids or lactones and diols, triols and higher alcohols, and diamines or aminoalcohols as illustrated, for example, by the reaction of neopentyl glycol, adipic acid and hexamethylenediamine. The amide-containing polyols also may be prepared through aminolysis by the reaction, for example, of carboxylates, carboxylic acids, or lactones with aminoalcohols. Examples of suitable diamines and aminoalcohols include hexamethylenediamine, ethylenediamine, phenylenediamines, toluenediamines, monoethanolamine, diethanolamine, N-methyl-monoethanolamine, isophorone diamine, 1,8-menthanediamine and the like.

Hydrophobic polyurethane polyols are generally known. Polyurethane polyols useful in the present invention can be produced by reacting any of the above-described polyols, including diols, triols, and higher alcohols, polyester polyols, polyether polyols, and amide-containing polyols with an organic polyisocyanate. The organic polyisocyanate may be reacted with the polyol either directly to form the polyurethane polyol or by the generally known prepolymer technique wherein the polyol and polyisocyanate are reacted in relative proportions to first produce an isocyanate terminated prepolymer with subsequent reaction of the prepolymer with additional polyol to form the polyurethane polyol. Also, mixtures of organic isocyanate prepolymers with monomeric isocyanates (so-called semi-prepolymers) may be employed in the prepolymer technique. In general, urethane formation improves the hydrophobicity of polyols.

The polyisocyanate which is reacted with the polyol essentially can be any organic polyisocyanate. The polyisocyanate may be aromatic, aliphatic, cycloaliphatic, or heterocyclic and may be unsubstituted or substituted with groups such as halogen, etc. Many such organic polyisocyanates are known, examples of which include: toluene-2,4-diisocyanate, toluene-2,6-diisocyanate, and mixtures thereof; diphenylmethane-4,4'-diisocyanate, diphenylmethane-2,4'-diisocyanate and mixtures thereof; p-phenylene diisocyanate; biphenyl diisocyanate; 3,3'-dimethyl-4,4'-diphenylene diisocyanate; tetramethylene-1,4-diisocyanate; hexamethylene-1,6-diisocyanate; 2,2,4-trimethylhexane-1,6-diisocyanate; lysine methyl ester diisocyanate; bis (isocyanatoethyl) fumarate; isophorone diisocyanate; ethylene diisocyanate; dodecane-1,12-diisocyanate, cyclobutane-1,3-diisocyanate; cyclohexane-1,3-diisocyanate, cyclohexane-1,4-diisocyanate and mixtures thereof; methylcyclohexyl diisocyanate; hexahydrotoluene-2,4-diisocyanate, hexahydrotoluene-2,6-diisocyanate and mixtures thereof; hexahydrophenylene-1,3-diisocyanate, hexahydrophenylene-1,4-diisocyanate and mixtures thereof; perhydrodiphenylmethane-2,4'-diisocyanate, perhydrodiphenylmethane-4,4'-diisocyanate and mixtures thereof. It is to be understood that mixtures of polyisocyanates and monoisocyanates may be utilized as the polyisocyanate for preparing the hydrophobic polyurethane polyols.

The less desirable hydrophobic alkyd polyols which as discussed above are considered herein to be a subclass of polyester polyols which may be used in the preparation of the reaction products are generally known. They typically are produced by reacting polyhydric alcohols, polycarboxylic acids, and fatty acids derived from drying, semi-drying or non-drying oils in various proportions depending upon the extent of hydroxyl functionality and properties desired in the alkyd polyol. The techniques of preparing such alkyd polyols are well known generally. Usually, the process involves reacting together the polycarboxylic acid and fatty acid or a partial glyceride thereof and the polyhydric alcohol (the latter usually in stoichiometric excess) in the presence of a catalyst such as litharge, sulfuric acid, or sulfonic acid to effect esterification with evolution of water. Examples of polyhydric alcohols typically used for preparation of the alkyd polyols include the simple diols, triols and higher hydric alcohols known in the art including but not limited to the previously described simple diols, triols, and higher hydric alcohols. Examples of polycarboxylic acids suitable for preparation of the alkyd polyols include those set forth previously in the description of polycarboxylic acids useful for preparing hydrophobic polyester polyols. Examples of suitable fatty acids include saturated and unsaturated acids such as stearic acid, oleic acid, ricinoleic acid, palmitic acid, linoleic acid, linolenic acid, licanic acid, elaeostearic acid, clupanodonic acid and mixtures thereof. The fatty acids may be in the form of the free acids with sufficient excess of the polyhydric alcohol being incorporated into the esterification mixture to compensate for their inclusion. However, in many instances, glyceride oils may be employed which have been partially alcoholized with a sufficient amount of a polyhydric alcohol such as glycerol to supply the requisite amount of available hydroxyls for the formation of the alkyd polyol.

As stated previously, the hydrophobic polyol is reacted with the organosilicon-containing material comprising an organosilicon-containing substance (defined herein), optionally a nonfunctional organosilane (defined herein), and optionally a functional organosilane (defined herein) to produce a reaction product of the invention. In some cases, the organosilicon-containing materials employed to produce the reaction products are either incompatible with the hydrophobic polyol or are undesirably highly volatile. An organosilicon-containing material which is incompatible with a hydrophobic polyol, when mixed at room temperature with the polyol, separates into layers. Therefore, the hydrophobic polyol and the organosilicon-containing material are reacted together to produce a homogeneous product. Furthermore, the homogeneous product is much less volatile under conditions of curing than an unreacted mixture of the polyol and organosilicon-containing material.

The organosilicon-containing substance required in the organosilicon-containing material is defined as follows. An organosilicon-containing substance useful in the invention is organic and is essentially free of alkali metal ions which distinguish it from generally known inorganic silicates such as alkali metal silicates including, for example, sodium orthosilicate. All atoms bonded directly to Si in the organosilicon-containing substance are selected from oxygen, nitrogen and/or chlorine, preferably oxygen and/or nitrogen, most preferably all of such atoms being oxygen. Thus, silicon in the organosilicon-containing substance will be bonded to atoms other than O and/or N, such as C or another Si atom, through the O or N atoms. The organosilicon-containing substance additionally has moieties directly bonded to Si which are easily displaceable by reaction with water and/or alcohol. Examples of moieties directly bonded to Si which are displaceable by reaction with water and/or alcohol include $-OR^1$,

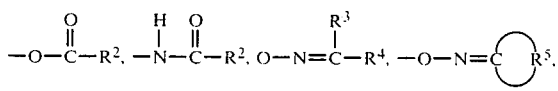

and the $C_2$ to $C_3$ residue of a 1,2- or 1,3-glycol, wherein
$R^1$ represents $C_1$–$C_7$ alkyl, $C_6$–$C_8$ cycloalkyl, $C_6$–$C_8$ aryl, or $C_3$–$C_8$ alkyloxyalkyl,
$R^2$ represents H or $C_1$–$C_4$ alkyl,
$R_3$ and $R_4$ independently represent H, $C_1$–$C_4$ alkyl, $C_6$–$C_8$ cycloalkyl, or $C_6$–$C_8$ aryl and $R^5$ represents $C_4$–$C_7$ alkylene.

Preferably all of the moieties directly bonded to Si which are displaceable by reaction with water and/or alcohol are lower alkoxy moieties selected from the group consisting of methoxy, ethoxy, and propoxy. It will be appreciated that the oxygen atom in, for example, an ethoxy moiety attached to Si of course serves as an atom bonded directly to Si selected from O, N, and/or Cl as discussed above. It is required that at least a part of the organosilicon-containing substance be hydrolyzed to a compound or a mixture of compounds. Generally, some of the hydrolysis products will be condensed to the corresponding siloxane materials containing one or more siloxane linkages

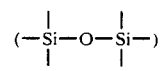

per molecule. The degree of hydrolysis of the hydrolyzed organosilicon-containing substance can conveniently be considered to be that degree of hydrolysis required to convert at least 10 percent, preferably at least 20 percent, and most preferably at least 30 percent by weight, of the moieties directly bonded to Si which are easily displaceable, theoretically to silanol groups

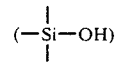

regardless of the actual degree of condensation of the silanol groups. For example, if tetraethylorthosilicate represented the silicon-containing substance, a degree of hydrolysis of 10 percent would mean that at least 10 percent by weight of the ethoxy moieties of the tetraethylorthosilicate could be thought to be theoretically converted to silanol groups regardless of the actual degree of condensation to siloxane containing compounds in the hydrolyzed product. Additionally, compounds or a mixture of compounds containing siloxane linkages in sufficient amounts to be considered to have been prepared theoretically from unhydrolyzed silicon-containing substances as defined herein, to at least a 10 percent, preferably at least 20 percent, and most preferably at least 30 percent degree of hydrolysis as defined above, regardless of the actual manner of preparation, are understood to fall within the definition of an organosilicon-containing substance at least a part of which is hydrolyzed to a compound or a mixture of compounds. Of course, the hydrolyzed organosilicon-containing substance must also contain a residual amount of the aforementioned moieties directly bonded to Si which are displaceable by reaction with water and/or alcohol.

It is also to be understood that the organosilicon-containing substances useful for the invention having atoms bonded directly to Si selected from O, N, and/or Cl are essentially free of functional groups directly attached to carbon atoms, examples of which groups include isocyanate, epoxy, amino, etc. As will be apparent, the previously described moieties bonded directly to Si which are displaceable by reaction with water and/or alcohol do not fall into the category of functional groups referred to in the immediately preceding sentence.

By way of illustration, an especially desirable class of organosilicon-containing substances suitable in the invention include organosilicates which prior to hydrolysis correspond to the following formula, I,

wherein
 $R^6$ represents methyl, ethyl or propyl,
 $R^7$ represents alkyl containing at least 4 carbon atoms, aryl, alkylaryl, arylalkyl, aryloxyalkyl, or alkyloxyalkyl, and
 x is an integer ranging from 0 to 3, preferably 0 or 1, and most preferably 0. Examples of useful organosilicates include: tetramethoxysilane, tetraethoxysilane, tetra-n-propoxysilane, methoxytriethoxysilane, dimethoxydiethoxysilane, trimethoxy-n-propoxysilane, bis(2-ethylhexoxy)diethoxysilane, butoxytriethoxysilane, and the like. Mixtures of organosilicates also may be used as the organosilicon-containing substance.

Of the organosilicates corresponding to the formula I, above, the tetraalkoxysilanes wherein x equals 0 in formula I are preferred. The tetraalkoxysilanes provide a high degree of functionality to the reaction products of the invention and enhance the ease with which the compositions of the invention can be cured. Additionally, the tetraalkoxysilanes are readily available at low cost. Furthermore, they can be used to attach modifying groups such as those represented by $-OR^7$ in formula I above, an example of which is a sec-butoxy group. Surprisingly, cured films produced from resins of the invention prepared from the organosilicates are resistant to degradation by water such as water vapor or liquid water.

Of the examples of organosilicates described above, tetramethoxysilane is desirable for some purposes because for example, of the ease with which it reacts with the hydroxyl moiety of the hydrophobic polyol during preparation of the reaction product and also with moisture during curing of a composition of the invention. Tetraethoxysilane is especially desirable since, although tetraethoxysilane is not as reactive as tetramethoxysilane, it does not provide the possibility of toxicity problems that may be encountered with the use of tetramethoxysilane and is not as highly volatile as tetramethoxysilane.

Examples of organosilicon-containing substances, other than the above organosilicates, which may be utilized in the invention include tetraacetoxysilane, diethoxydiacetoxysilane, and

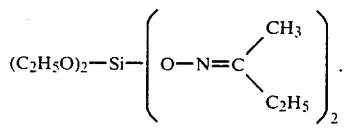

As stated previously, at least a part of the organosilicon-containing substance is hydrolyzed for preparation of the reaction products. Hydrolyzed organosilicon-containing substances provide increased reactive groups per molecule in the reaction products. Additionally, the hydrolyzed organosilicon-containing substances help provide low volatility to the reaction products.

Generally, some of the hydrolysis products will be condensed to the corresponding siloxane materials. These siloxane materials contain compounds containing one or more siloxane linkages represented by the formula, II,

Usually these hydrolyzed and condensed organosilicon-containing substances are prepared in generally known manner by the hydrolysis of precursors which contain silicon atoms attached to substituents convertible to hydroxyl (i.e., silanol) groups. These hydrolysis reactions typically may be illustrated as, $$Si(X)_4 + H_2O = (X)_3SiOH + HX,$$

in which X can be an easily displaceable group such as $C_1$-$C_3$ alkoxy,

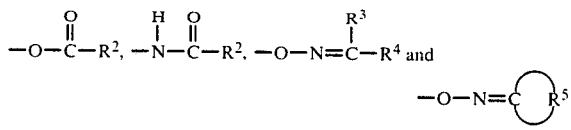

which groups are defined as above. The above silanol containing products are often condensed to produce one or more

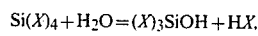

linkages in the hydrolyzed and condensed organosilicon-containing substances. Of course, it should be understood that organosilicon-containing substances which are hydrolyzed are intended to include those hydrolyzed materials prepared from precursors which contain silicon atoms attached to hydrolyzable substituents other than the hydrolyzable groups defined above (represented by X in the equation above) such hydrolyzable substituents including, for example, halogen such as chloro. Such hydrolyzed materials prepared from precursors which contain silicon atoms attached to hydrolyzable halo substituents are substantially the same as those hydrolyzed materials prepared from precursors which contain silicon atoms attached to hydrolyzable groups X defined above, inasmuch as both types of precursors when hydrolyzed from silanol groups which can be condensed to form siloxane linkages.

It is also considered to be within the scope of the present invention to use mixtures of the organosilicon-containing substances and hydrolyzed organosilicon-containing substances as the organosilicon-containing material for preparation of the reaction products of the invention.

Some specific examples of hydrolyzed and condensed organosilicon-containing substances useful for preparing the reaction products include hexaethoxyl disiloxane, octaethoxy trisiloxane, and SILBOND-40, a hydrolyzed and condensed tetraethoxysilane available from Stauffer Chemical Company.

Where desired, organosilicon-containing substances and/or hydrolyzed organosilicon-containing substances containing higher alkoxy, aryloxy, arylalkyloxy, alkylaryloxy, alkyloxyalkyloxy, and/or aryloxyalkyloxy moieties attached to one or more silicon atoms in addition to the required displaceable moieties may be employed, for preparation of the reaction products. The term "higher alkoxy" is intended to mean an alkoxy group having at least 4 carbon atoms such as sec-butoxy, n-pentoxy, isopentoxy, neopentoxy, hexoxy, nonoxy, isodecyloxy and the like. Examples of aryloxy, arylalkyloxy, alkylaryloxy, alkyloxyalkyloxy, and/or aryloxyalkyloxy moieties include phenoxy, benzyloxy, phenylethoxy, tolyloxy, xylyloxy, 4-ethylphenoxy, phenoxyethoxy, 2-butoxyethoxy and the like. It is believed that the presence of such higher alkoxy, aryloxy, arylalkyloxy, alkylaryloxy, alkyloxyalkyloxy, and/or aryloxyalkyloxy moieties from the organosilicon-containing material provides decreased volatility to the compositions of the invention and enhanced hydrolytic stability to cured films prepared from the compositions of the invention. However, as stated previously, the reaction product should contain a residual amount of the moieties from the organosilicon-containing material (i.e., component B) which are directly bonded to silicon and are displaceable such that the reaction product is capable of curing to a continuous film by reaction of such residual displaceable moieties with moisture and/or any residual hydroxy moieties from the hydrophobic polyol or hydroxyl moieties from polyols which may be mixed with the reaction product prior to curing a composition of the invention. Additionally, the amount of the residual hydroxyl moieties in the reaction product should be less than an amount which would allow the reaction product to gel when subjected to the gel test described infra. The reaction products of the invention are not capable of being gelled according to this gel test. It should be understood that gelation of the reaction product when subjected to the gel test described infra is of course to be distinguished from gelation of the reaction product during curing conditions; for example, when the reaction product is cured in the presence of moisture and/or in the presence of polyol which may be admixed with the reaction product when desired in the preparation of coating compositions containing such admixed polyol. When an organosilicate is the organosilicon-containing substance, the reaction product generally will contain from 20 to 1.5 milliequivalents per gram of the reaction product of lower alkoxy moieties, —$OR^6$, as defined in formula I above. Moreover, the organosilicon-containing material typically utilized for reaction with the hydrophobic polyol will have a total content of lower alkoxy moieties based on the organosilicon-containing substance, optional nonfunctional organosilane and optional functional organosilane ranging from 26 milliequivalents per gram to 5 milliequivalents per gram of organosilicon-containing material. It is of course to be understood that when a nonfunctional organosilane and/or a functional organosilane is included in the organosilicon-containing material in addition to the organosilicon-containing substance, at least a part of which organosilicon-containing substance is hydrolyzed, that the nonfunctional and/or functional organosilane can be partially hydrolyzed either individually or in combination with the organosilicon-containing substance. Thus, when organosilicate is utilized as organosilicon-containing substance in combination with nonfunctional and/or functional organosilane, the range of 26–5 milliequivalents of lower alkoxy moieties per gram of organosilicon-containing material includes any lower alkoxy moieties from the functional and/or nonfunctional organosilane whatever the degree of hydrolysis and condensation of the components of the organosilicon-containing material. Typically, the higher ratio by weight of higher alkoxy, aryloxy, arylalkyloxy, alkylaryloxy, alkyloxyalkyloxy, and/or aryloxyalkyloxy moieties to the displaceable moieties (such as lower alkoxy moieties) in the reaction product, the lower the cure response to the reaction product. By lower "cure response" is meant either a longer time at a given temperature, or a higher temperature for a given length of time, to cure a composition of the invention to a dry, tack free state.

Optionally, the organosilicon-containing material for the preparation of the reaction product optionally may comprise an organosilicon material selected from a nonfunctional organosilane, a hydrolyzed nonfunctional organosilane or a mixture thereof as well as cohydrolyzed products of the organosilicon material and the organosilicon-containing substance. These organosilicon materials can be utilized to help provide hydrophobicity to the organosilicon-containing material where desired. When the organosilicon-containing material does comprise such organosilicon material, the amount of such organosilicon material generally ranges from greater than 2 to less than 80 percent, preferably less than 50 percent, and most preferably less than 25 percent, by weight of the organosilicon-containing material. As used herein, a nonfunctional organosilane is understood to mean a material corresponding to the formula, III,

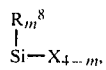

wherein
R$^8$ represents hydrogen, alkyl, aryl, alkylaryl, arylalkyl, or aryloxyalkyl;
X represents

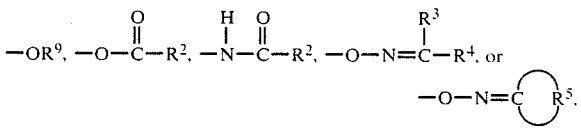

wherein
R$^9$ represents C$_1$–C$_3$ alkyl,
R$^2$ represents H or C$_1$–C$_4$ alkyl,
R$_3$ and R$^4$ independently represent H, C$_1$–C$_4$ alkyl, C$_6$–C$_8$ cycloalkyl, or C$_6$–C$_8$ aryl,
R$^5$ represents C$_4$–C$_7$ alkylene, and
m is an integer ranging from 1 to 3, preferably 2 or 3, and most preferably 1.

It should be understood that the term "nonfunctional organosilane" wherever appearing herein is used for convenience to distinguish compounds corresponding to the above formula, III (or the hydrolysis products thereof) from those compounds (or the hydrolysis products thereof) referred to herein for convenience as functional organosilanes and corresponding to the formula IV infra. Thus, although moieties defined by X in formula III are considered to be easily displaceable by reaction with water and/or alcohol and are therefore necessarily rather reactive, they are not defined herein as "functional" as this word is used in connection with the definition of a "functional organosilane" infra.

Typically, when a nonfunctional organosilane (or a hydrolysis product thereof) is utilized as part of the organosilicon-containing material (component B), a nonfunctional organosilane corresponding to formula III in which X corresponds to —OR$_9$ as defined above is employed.

Examples of nonfunctional organosilanes corresponding to the above formula, III, include trimethoxymethylsilane, dimethoxydimethylsilane, methoxytrimethylsilane, triethoxymethylsilane diethoxydimethylsilane, ethoxytrimethylsilane, dimethoxydiphenylsilane, diethoxydiphenylsilane, diethoxymethylphenylsilane, ethoxydimethylphenylsilane, methoxydimethylphenylsilane, ethoxytripropylsilane, diethoxydipropylsilane, dimethoxydipropylsilane, and the like. Additional examples of the nonfunctional organosilanes include amyltriethoxysilane and triethoxysilane. Mixtures of nonfunctional organosilanes also may be used as the optional organosilicon material.

Such organosilicon materials contribute to water resistance, toughness, and stain resistance of cured films prepared from compositions of the invention incorporating these organosilicon materials (and/or hydrolysis products thereof). Trialkoxysilanes corresponding to formula III above (i.e., m equals 1 and X represents —OR$^9$) are preferred, those in which R$^8$ represents hydrogen, methyl, ethyl, or phenyl being most preferred. These trialkoxysilanes are especially preferred when such organosilicon materials are employed because of the balance they provide among hydrophobicity, ease of reaction with the hydrophobic polyol, availability, and the contribution of the —OR$^9$ groups to good curing. However, the dimethyldialkoxysilanes corresponding to formula III above are less desirable than the trialkoxysilanes since it is believed that the dimethyldialkoxysilanes tend to decrease adhesion to the substrate of cured films prepared from compositions of the invention incorporating the dimethyldialkoxysilanes. The monoalkoxysilanes corresponding to formula III above (i.e., m equals 3 and X represents —OR$^9$) are the least desirable of this type of organosilicon material since they act as chain terminators in the reaction between the organosilicon-containing material and the hydrophobic polyol. Thus, when the monoalkoxysilanes are to be utilized in the preparation of the reaction products, they should be used in controlled amounts.

As stated above, trialkoxysilanes corresponding to formula III such as methyltrimethoxysilane are especially preferred as the optional organosilicon material. Phenyltrialkoxysilane or trialkoxysilanes wherein —R$^8$ in formula III is represented by an aliphatic group containing more than about 14 carbon atoms are less desirable than methyltrimethoxysilane since they tend to decrease the ease of curing of compositions of the invention. However, phenyltrialkoxysilanes often help the weatherability of films when properly cured.

When a mixture containing trialkoxysilanes and dialkoxysilanes is employed as the optional organosilicon material, the moles of trialkoxysilane to moles of dialkoxysilane can vary to give desirable properties. The average functionality based on lower alkoxy moieties of a mixture containing the organosilicon-containing substance and nonfunctional organosilanes for preparation of a reaction product of the invention excluding the contribution to lower alkoxy moieties by any monoalkoxysilane which may be present in the mixture generally is greater than 2.2, preferably is greater than 2.7, and most preferably is greater than 3.3. For example,

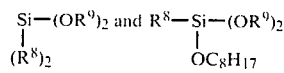

would represent difunctional compounds with respect to the lower alkoxy moieties —OR$^9$. The —OC$_8$H$_{17}$ group for example (which can be present in the nonfunctional organosilane as discussed in the following paragraph) would not contribute to the aforesaid average functionality.

Where desired, a nonfunctional organosilane, hydrolyzed nonfunctional organosilane, or mixture thereof, containing higher alkoxy, aryloxy, alkylaryloxy, arylalkyloxy, alkyloxyalkyloxy, and/or aryloxyalkyloxy moieties as defined previously may be used as the optional organosilicon material. The organosilicon materials containing such moieties are believed to contribute to decreased volatility of compositions of the invention and also to water resistance to cured films which may be prepared from the reaction products incorporating these organosilicon materials. Organosilicon materials containing such moieties may be prepared, for example, by reacting an organosilane, hydrolyzed organosilane, or a mixture thereof, with a suitable monohydric alcoholic or monohydric phenolic material so as to provide higher alkoxy, aryloxy, alkylaryloxy, arylalkyloxy, alkyloxyalkyloxy, and/or aryloxyalkyloxy moieties to the organosilane. Examples of such organosilanes include: pentoxydimethoxymethylsilane, isopentoxydiethoxymethylsilane, 2-ethylhexoxydiethoxymethylsilane, 2-butoxyethoxydiethoxymethylsilane, diisodecyloxyethoxymethylsilane, phenoxydiethoxyphenylsilane, ethoxyphenoxydipropylsilane, tolyloxydimethoxymethylsilane, phenylethyloxydimethoxymethylsilane, benzyloxydiethoxymethylsilane, and the like. Mixtures of nonfunctional organosilanes containing such higher alkoxy, aryloxy, alkylaryloxy, arylalkyloxy, alkyloxyalkyloxy, and/or aryloxyalkyloxy moieties also may be used as the optional organosilicon material.

Hydrolyzed nonfunctional organosilanes are organosilanes corresponding to the above formula, III, which have been hydrolyzed in known manner. Generally, some of the hydrolysis products are condensed to the corresponding siloxane materials which contain one or more siloxane linkages represented by formula, II, above. Usually these hydrolyzed nonfunctional organosilanes are prepared in generally known manner similar to the preparation of the hydrolyzed organosilicon-containing substances such as the hydrolyzed organosilicates described above. Hydrolysis reactions for the preparation of hydrolyzed nonfunctional organosilanes may be illustrated as,

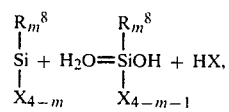

in which,

R$^8$ represents hydrogen, alkyl, aryl, alkylaryl, arylalkyl, or aryloxyalkyl;

X represents a hydrolyzable group as defined in formula III above; and m is an integer ranging from 1 to 3. The above silanol products are generally condensed to produce siloxane linkages in the hydrolyzed nonfunctional organosilanes. As for the hydrolyzed organosilicates described above, it should be understood that the phrase, "hydrolyzed nonfunctional organosilane" is intended to include those hydrolyzed materials prepared from precursors which contain silicon atoms attached to hydrolyzable substituents other than the hydrolyzable groups, above represented by X in formula III, such hydrolyzable substituents including, for example, halogen such as chloro.

It is also considered to be within the scope of the present invention to use mixtures of the optional nonfunctional organosilanes and hydrolyzed nonfunctional organosilanes optionally containing higher alkoxy, aryloxy, alkylaryloxy, arylalkyloxy, alkyloxyalkyloxy, and/or aryloxyalkyloxy moieties, as part of the organosilicon-containing material for preparation of resins of the invention.

Optionally, the organosilicon-containing material (component B) may comprise a functional organosilane. When the organosilicon-containing material does comprise such functional organosilane, the amount of such functional organosilane generally ranges from greater than 2 to less than 50 percent, preferably less than 30 percent, and most preferably less than 15 percent, by weight of the organosilicon-containing material. As used herein, a "functional organosilane" is intended to include materials corresponding to the following formula, IV, $$Y-G-SiX_3, \qquad (IV)$$

wherein

G represents an organo group containing from 2 to 12 carbon atoms,

X represents

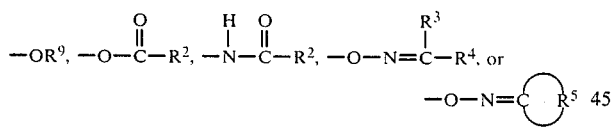

wherein $R^1$ represents $C_1$–$C_3$ alkyl, $R^2$ represents H or $C_1$–$C_4$ alkyl, $R^3$ and $R^4$ independently represent H, $C_1$–$C_4$ alkyl, $C_6$–$C_8$ cycloalkyl or $C_6$–$C_8$ aryl, $R^5$ represents $C_4$–$C_7$ alkylene, and Y represents an amino, epoxy, mercapto, isocyanate, ureido, a group corresponding to

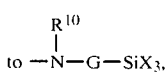

or a group corresponding to —$SiX_3$ wherein $R^{10}$ represents H or $C_1$–$C_4$ alkyl and G and X are as defined above.

In accordance with the discussion of the distinction between nonfunctional organosilanes and functional organosilanes as these terms are used herein, groups defined by Y above are considered to be the "functional" groups encompassed by the term "functional organosilane." Some examples of functional organosilanes include gamma-aminopropyltriethoxysilane, beta-aminoethyltriethoxysilane, gamma-mercaptopropyltriethoxysilane, gamma-isocyanatopropyltriethoxysilane, and ureidopropyltriethoxysilane. It will be appreciated by those skilled in the art that functional organosilanes containing mutually reactive functional groups such as 1,2-epoxy and amino, or amino and isocyanato, etc., or groups defined by Y above which are reactive with groups defined by X above, should be employed in controlled amounts to prepare the reaction products so as to avoid gelation or high viscosity products.

It is to be understood that mixtures or hydrolyzed mixtures of (1) the organosilicon-containing substance, hydrolyzed organosilicon-containing substance or mixtures thereof optionally containing higher alkoxy, aryloxy, alkylaryloxy, arylalkyloxy, alkyloxyalkyloxy, and/or aryloxyalkyloxy moieties with, (2) the optional nonfunctional organosilanes, hydrolyzed nonfunctional organosilanes and mixtures thereof optionally containing higher alkoxy, aryloxy, alkylaryloxy, arylalkyloxy, alkyloxyalkyloxy, and/or aryloxyalkyloxy moieties, and (3) the optional functionalorganosilanes, hydrolyzed functional organosilanes and mixtures thereof may be employed as the organosilicon-containing material for preparation of the reaction products of the instant invention.

Although the incorporation of the nonfunctional and/or functional organosilanes (and/or the hydrolysis and cohydrolysis products thereof) in the organosilicon-containing material may be desirable for some purposes, these materials tend to be costly. Surprisingly, it has been found that cured compositions of the invention having good properties may be prepared from the reaction products wherein the amount of such nonfunctional and/or functional organosilanes has been minimized or even eliminated in the silicon-containing starting material for preparation of the reaction product. For example, coating compositions which cure to films having good properties such as gloss, hardness, and water resistance may be prepared from reaction products wherein the organosilicon-containing material comprises from 50 to 100 percent by weight, based on the total weight of the organosilicon-containing material, of the organosilicon-containing substance at least a portion of which is hydrolyzed and at least partially condensed.

In preparing the reaction product, a hydrophobic polyol is mixed at room temperature with an organosilicon-containing material (component B) at least a part of which is hydrolyzed and reacted typically under a blanket of a nonreactive gas such as nitrogen at a temperature ranging from about 50° C. to about 180° C. for 0.5 to 50 hours with or without removing by distillation the low boiling volatile reaction product such as the volatile alcohol. If distillate is removed, a fractionating column may be used as a precaution to prevent removal of the starting materials. Depending on the choice of reactants, and optionally catalysts, the reaction may be conducted under milder or more severe conditions of time and temperature. For example, the reaction may be conducted at a temperature such as 80° C. for about 1 hour without removal of alcohol. Or where the starting materials are less reactive, the reaction may be conducted for example at 175° C. for 3 hours in the presence of a catalytic amount of stannous octoate with the removal of volatile alcohol. In cases where the organosilicon-containing material and hydrophobic polyol are incompatible, the reaction is conducted at least until the reaction product is homogeneous (i.e., does not separate into layers at room temperature) and preferably optically clear. Therefore, reaction products which are not capable of being gelled according to the gel test described infra but which are stable dispersions are considered to be within the scope of the invention. Since, typically, the reactants are quite fluid, it is usually not necessary, and usually preferable, not to include solvents in the reaction medium, particularly where the product is to be used as essentially the only film forming component in a coating composition or where the product is to be used in a high solids coating composition with other components including an added organic solvent. A high solids coating composition as defined herein typically contains at least 50 percent, preferably at least 60 percent, and most preferably at least 70 percent, by weight resin solids based on the weight of that portion of the composition including the reaction product (i.e., resin) and organic solvent but excluding the weight of pigments, fillers and the like which may be present in the coating composition. However, where desired, solvents which are compatible with the reactants can be employed. Moreover, the reaction product may be thinned with solvent. Examples of such solvents include conventional ketones such as methyl ethyl ketone, hydrocarbons such as xylene and toluene, the mono- and dialkylethers of diethylene glycol such as diethylene glycol dibutyl ether and diethylene glycol diethyl ether and low molecular weight alcohols such as ethanol.

Water can be employed to hydrolyze unhydrolyzed organosilicon-containing material prior to, during, or even after reaction of the organosilicon-containing material with the hydrophobic polyol.

Where water is employed in the reaction mixture, the amount of water must be controlled because water is a reactant in the reaction mixture. Moreover, it is desirable that such water not be present as a separate phase. Additionally, a moisture-free atmosphere usually is employed because uncontrolled hydrolysis of the organosilicon-containing substance during reaction product preparation is not desired and also to minimize the water content in the reaction product. Of course, it is to be understood that residual amounts of water as contained, for example, in commercially available polyester polyols which can be used in the reaction product preparation, are tolerable even where it is desired to minimize hydrolysis of the organosilicon-containing substance and water content in the reaction product and in fact is useful to hydrolyze at least a part of the organosilicon-containing substance, particularly where an unhydrolyzed organosilicon-containing substance is employed as starting material.

Depending on the particular choice of reactants, the reaction between the organosilicon-containing material and hydrophobic polyol may be sluggish, and where desired, a catalyst may be utilized to speed up the reaction. Examples of such catalysts include: acids such as paratoluenesulfonic acid; tin-containing compounds such as butylstannoic acid, dibutyl tin oxide; and stannous octoate; titanates such as tetraisopropyltitanate and tetrabutyltitanate; and the like. When catalysts are utilized in the preparation of the reaction products, reaction temperatures lower than about 120° C. are feasible. However, temperatures ranging from 160° C. to 200° C. are typically employed when a minimal amount of catalyst (or no catalyst) is used during resin preparation so as to optimize package stability.

The reaction products of the invention advantageously can be prepared from organosilicon-containing materials and hydrophobic polyols which are initially incompatible with one another. Such incompatible starting materials separate into layers at room temperature within a relatively short period even after thorough initial mixing. Additionally, resins of the invention advantageously can be prepared from organosilicon-containing materials containing low molecular weight, highly volatile, but readily available organosilicon-containing substances, for example, including tetramethylorthosilicate and tetraethylorthosilicate, and optionally low molecular weight, highly volatile nonfunctional organosilanes, for example, including methyltrimethoxysilane and methyltriethoxysilane. Such low molecular weight organosilicon-containing materials may be hydrolyzed to less volatile compounds before, during, or after combination with the hydrophobic polyol and before, during, or after reaction of the organosilicon-containing material with the hydrophobic polyol.

The amounts by weight of the hydrophobic polyol and organosilicon-containing material for preparation of the reaction products may vary. Generally, the amounts by weight of hydrophobic polyol and organosilicon-containing material are selected so that when reaction is discontinued, the homogeneous reaction product contains sufficient residual moieties, directly bonded to silicon which are displaceable by reaction with water and/or alcohol, from the organosilicon-containing material that the reaction product can be self-cured, with or without a catalyst, to a continuous film in the presence of moisture. Additionally the reaction product will have a ratio of milliequivalents of the residual moieties directly bonded to Si which are displaceable by reaction with water and/or alcohol to milliequivalents of hydroxyl moieties from the hydrophobic polyol which is greater than 1, preferably greater than 3. Moreover, a reaction product according to the invention will not be capable of being gelled when subjected to the three-step gel test specifically described infra. Thus the amount of residual hydroxyl moieties from the hydrophobic polyol in the reaction product is less than an amount which would permit the reaction product to be gelled when subjected to the three-step gel test. Typically, the specific hydrophobic polyol and organosilicon-containing material are selected and amounts of these respective starting materials chosen so that when reaction is discontinued, the homogeneous reaction product typically has a content of the residual moieties from the organosilicon-containing material which are displaceable ranging from 20 milliequivalents to 1.5 milliequivalents per gram of reaction product and a content of residual hydroxyl moieties from the hydrophobic polyol ranging from 0 milliequivalents to 6 milliequivalents per gram of reaction product. As used herein, one milliequivalent of either the hydroxyl moiety or the displaceable moiety directly bonded to silicon is equal to one millimole. For example, when the moieties from the organosilicon-containing material which are directly bonded to silicon and are displaceable are lower alkoxy moieties selected from methoxy, ethoxy and/or propoxy, the reaction product generally will have a residual content of the lower alkoxy moieties ranging from 20 to 1.5 milliequivalents per gram of reaction product and a content of residual hydroxyl moieties from the hydrophobic polyol ranging from 0 milliequivalents to 6 milliequivalents per gram of reaction product.

Depending on the particular choice of hydrophobic polyol and organosilicon-containing material, the mole ratio of hydroxyl moieties to, for example, lower alkoxy moieties in the starting materials to produce homogeneous reaction products which are not capable of gelling, according to the gel test described infra, will vary. However, a useful guide for choosing the appropriate mole ratio is to choose the polyol and organosilicon-containing starting materials so as to provide a ratio of equivalents of hydroxyl moieties to equivalents of the displaceable moieties, such as lower alkoxy moieties, ranging from about 1:2 to about 1:12. Typically, a ratio of equivalents of about 1:4 to about 1:6 has been employed in the specific examples described infra.

Several variations on the general procedure for reacting the hydrophobic polyol and organosilicon-containing material to produce a homogeneous product, preferably of low volatility, will be described to illustrate some of the various procedures which may be employed for preparing the reaction products.

In a first procedure, employing initially an unhydrolyzed organosilicon-containing substance, the hydrophobic polyol and organosilicon-containing material are at least partially reacted together typically until reaction between the organosilicon-containing material and hydrophobic polyol is essentially complete, i.e., until at least 80 percent of the milliequivalents of hydroxyl moieties initially present from the hydrophobic polyol have reacted. Typically the reaction is carried out without the use of a catalyst, or with only a minimal level of catalyst, particularly where it is desired to minimize the presence of a catalyst in the reaction product. Thereafter, a controlled amount of water is introduced into the reaction vessel to hydrolyze at least a part of the organosilicon-containing material present in the reaction product mixture thereby reducing the volatility of the homogeneous reaction product.

In a second procedure, the hydrophobic polyol and partially hydrolyzed organosilicon-containing material are at least partially reacted together typically until the reaction is essentially complete, optionally followed by vacuum distillation and removal of at least part of any remaining, volatile organosilicon-containing material, to produce a homogeneous product having low volatility.

In a third procedure, the organosilicon-containing material is first reacted with a controlled amount of water preferably at about 35° C. in a homogeneous system so as to at least partially hydrolyze the organosilicon-containing material. Thereafter, with or without removing the volatile by-products, the resulting, less volatile hydrolyzed product is reacted with the hydrophobic polyol to produce a product of the invention having low volatility.

In a fourth procedure, the hydrophobic polyol, organosilicon-containing material, and a controlled amount of water are introduced into a reaction vessel and thereafter reacted together in a single step to produce a product of the invention having low volatility.

As stated previously, for some purposes it may be desirable to incorporate moieties of the type, $-OR^7$, as defined in formula I in the reaction products. These moieties may be provided by the organosilicon-containing material from, for example, the organosilicon-containing substance and/or a nonfunctional organosilane (including their hydrolysis products). Such moieties, $-OR^7$, can be provided, for example, from modification of the organosilicon-containing material with an appropriate monohydric alcohol, before reaction with the hydrophobic polyol, during reaction with the hydrophobic polyol, or possibly even after reaction with the hydrophobic polyol. Such moieties may be desirable, for example, to modify the solubility characteristics of the organosilicon-containing material before reaction with the polyol or to modify the solubility characteristics of the reaction product. Additionally, incorporation of such moieties into a reaction product of the invention can be employed to additionally decrease the volatility of the product, increase the hydrophobic character of the product, alter the functionality of the product with respect to the curing moieties, and to modify the characteristics of a cured film prepared from a reaction product of the invention.

For example, an organosilicate corresponding to formula I wherein x equals 0, a hydrolyzed organosilicate, or a mixture thereof may be reacted with a monohydric alcohol, examples of which include: isobutyl alcohol, tert-butylalcohol, 1-phenyl-1-ethanol, sec-butyl alcohol, 2-methyl-2-butanol, 1-pentanol, neopentyl alcohol, 2-butoxyethanol, 2-hexoxyethanol, cyclohexanol, 2-methyl-2-hexanol, 2-ethyl-2-hexanol, 1-octanol, 2-octanol, 1-nonanol, 5-butyl-5-nonanol, isodecyl alcohol, 2-phenylethanol, and benzyl alcohol. Prereaction or postreaction of the monohydric alcohol with the organosilicate is one means of providing higher alkoxy, aryloxy, arylalkyloxy, alkylaryloxy, alkyloxyalkyloxy, and/or aryloxyalkyloxy moieties to the silicon atoms in the organosilicate material. Preferably, anhydrous monohydric alcohols are employed for this purpose. The organosilicate material which has been reacted with the monohydric alcohol is then mixed with the hydrophobic polyol and reacted essentially according to the procedures described above. As discussed previously, similar modification of, for example, a nonfunctional organosilane can be employed to introduce such moieties into the reaction product.

Another way of incorporating moieties, $-OR^7$ as defined in formula I in compositions of the invention is to first react a hydrophobic polyol with an organosilicate, hydrolyzed organosilicate or mixture thereof according to the procedures set forth above followed by the reaction of the resulting product with a monohydric alcohol according to the procedure set forth in the paragraph immediately above.

Generally, compositions of the invention may have a wide range of viscosities. An advantage of the compositions of the invention is that they usually have low viscosities relative to their molecular weights. The viscosities of the reaction products of the invention as measured at 25° C. with a Brookfield viscometer generally range from about 50 centipoise for (neat) reaction products without any added solvent or diluent up to about 5,000 centipoise for reaction products to which up to 20 percent by weight, based on the weight of the reaction product, of a suitable solvent or diluent has been added. The reaction products which are preferred for high solids coating applications typically have Brookfield viscosities at 25° C. in the absence of any added solvent or diluent (i.e., neat) ranging from about 50 to about 5,000 centipoise, most preferably from about 500 to about 4,000 centipoise.

As stated previously, a composition of the invention comprises a reaction product of the hydrophobic polyol and the organosilicon-containing material which is homogeneous, has a relatively low volatility, is capable of being self-cured in the presence of moisture, and is not capable of being gelled when subjected to the gel test described infra. As will be appreciated by those skilled in the art of polymer science in general, an equation commonly referred to as the Flory equation has been used as a guideline to determine if a reaction mixture should gel, for example, given the number of moles of each of the reactive components, the number of reactive groups on each reactive component (i.e., the functionality of each component) and the desired theoretical extent of reaction (for example, 100 percent) of one of the reactive components. However, it has been found that the Flory equation does not provide a useful guideline for predicting whether a reaction mixture containing polyol and organosilicon-containing material will gel or not, probably because of the tendency in siloxane chemistry for the formation, for example, of six and eight membered rings which cannot easily be taken into account in the Flory equation.

Therefore, the following simple three-step procedure (or gel test) is given for determining whether a reaction product prepared from hydrophobic polyol and organosilicon-containing material will gel. If the product resin does gel as determined by the following three-step procedure, it is considered not to be within the scope of the present invention.

(Step 1) A 10-gram sample of the homogeneous reaction product is introduced into a 2-ounce glass jar (about 15 centimeters high by 7.5 centimeters in diameter). The jar is covered with a cap. Next, the jar and its contents are heated in an oven at 300° F. (149° C.) for 120 minutes. Thereafter, the jar is removed from the oven and tilted while still at essentially the oven temperature. A gelled product will not flow whereas an ungelled product will flow like a liquid at oven temperature. If the reaction product is gelled by the end of step 1, the reaction product is considered not to be a reaction product of the invention. If the reaction product has not gelled by the end of step 1, step 2 is performed on the ungelled product on which step 1 has already been performed. Step 2 is the same as step 1 except that 0.5 gram of stannous octoate is introduced into the sample before the procedure of step 1 is repeated and a vent hole is punched in the cap and covered with a piece of masking tape. If the product is gelled by the end of step 2, it is considered not to be a reaction product of the invention. If the reaction product has not gelled by the end of step 2, step 3 is performed on the ungelled product on which step 2 has already been performed. Step 3 is the same as step 2 except that no additional catalyst is added and the temperature is 400° F. (204° C.). If the reaction product is gelled at the end of step 3, it is considered not to be a reaction product of the invention.

The following procedure is offered as one procedure for determining the amount of lower alkoxy moieties in a reaction product containing lower alkoxy moieties. The product is analyzed for free alcohol content. Ten grams of the reaction product is mixed with 50 grams of a monohydric alcohol having a high boiling point such as n-octyl alcohol and 3 grams of stannous octoate. The resulting mixture is heated at 170° C. in an oil bath and the low boiling alcohols are removed by distillation. This operation may last up to three hours. The resulting distillate is analyzed by gas chromatography to determine the selective proportions of the lower boiling alcohols. From the weight of the distillate, its composition, and the free alcohol content of the sample, one can readily determine the moles of lower alkoxy moieties per gram of reaction product. The moles of lower alkoxy moieties per gram of reaction product can be converted to a percent by weight of lower alkoxy moieties based on the weight of reaction product or alternatively to milliequivalents of lower alkoxy moieties per gram of reaction product.

The following procedure is used herein to determine the percent by weight of solids in a reaction product of the invention. An 0.5 gram sample of resin is weighed onto an aluminum tray. The tray containing the sample is placed in a desiccator at 150° F. (65.6° C.) under a vacuum of 1 torr for 16 hours. The tray containing the sample is allowed to cool to room temperature under the vacuum and then reweighed. The percent by weight solids is calculated as the weight of the sample after the 16 hour heating procedure described above divided by the weight of the sample before the heating procedure times 100. For a less accurate determination of the percent by weight solids content of a reaction product than that described immediately above, a larger sample (for example, 5 grams) is distilled at 150° F. (65.6° C.) under a vacuum of 1 torr for 3 hours. The percent by weight solids content is calculated as the weight of the residue after heating divided by the weight of the sample before heating times 100.

Using the procedure for determining the percent by weight solids described above, the volatility of a reaction product of the invention also can be determined. Reaction products characterized as having "low volatility" exhibit a minimum of 50 percent by weight retention of organosilicon-containing material based on the weight of organosilicon-containing material in the product before and after the above percent by weight solids determination. Preferred products show a 60 percent by weight retention, and most preferred products show a 70 percent by weight retention.

The hydroxyl value, and therefore the hydroxyl equivalent weight, of a reaction product of the invention can be determined by generally known procedures.

Most of the compositions of the invention are storage stable for periods of at least one year in airtight containers so as to prevent the introduction of moisture into the composition. Where desired, they may be stored under dry nitrogen. Also, product compatible materials which easily hydrolyze so as to act as scavengers for water may be combined with the composition. Examples of such easily hydrolyzable product compatible materials include organosilicates, organosilanes, or materials such as ethylorthoformate and 2,2-dimethoxy propane. Water-scavenging amounts of organosilicates or organosilanes can be incorporated with the product either by combining them with the product after the reaction product is prepared or by employing an excess of the organosilicon-containing material during the reaction of this material with the hydrophobic polyol. To those that are not as stable as desired, such as some prepared using a catalyst, the reaction products surprisingly can be stabilized by using trace amounts of compounds which act as inhibitors such as boron trifluoride etherate (a 1 to 1 mole ratio of boron trifluoride in diethyl ether).

The reaction products of the invention advantageously may be utilized, with or without the presence of a catalyst, as essentially a sole film former for coating various substrates such as metal, paper, wood, hardboard, plastics and the like. They may be pigmented or unpigmented and may be utilized in the presence of various generally known additives such as flow control agents, surfactants, leveling agents, anti-mar agents, fungicides, mildewcides, and the like. Examples of pigments include any of the generally known pigments including extender pigments used in the coatings and resins industry such as titanium dioxide, magnesium carbonate, dolomite, talc, zinc oxide, magnesium oxide, iron oxides red and black, barium yellow, carbon black, strontium chromate, lead chromate, molybdate red, chromoxide green, cobalt blue, organic pigments of the azo series, etc. Mixtures of pigments also may be employed.

Coating compositions utilizing the reaction products of the invention may be applied to substrates using any suitable technique such as brushing, spraying, roll coating, doctor blade coating, etc.

Coating compositions utilizing the reaction products typically may be cured within about 30 minutes at a temperature of about 250° F. (121° C.). Examples of catalysts which may be utilized to promote curing of the compositions include tetraisopropyl titanate, gamma-aminopropyltriethoxsilane, trifluoromethane sulfonic acid, dibutyl tin dilaurate, stannous octoate, aluminum tris(sec-butoxide) and zinc tetrabutoxide. When a catalyst is utilized to promote curing of a composition of the invention, the catalyst typically may be present in an amount ranging from about 0.1 to about 5 percent by weight based on the weight of the reaction product of the invention.

Additionally the reaction products of the invention can be utilized as curing agents, in addition to or in substitution for generally known curing agents, for polyols generally known for use in coating compositions, examples of which polyols include but are not limited to the various hydrophobic polyols described herein. Thus these generally known polyols would be understood also to include, where desired, generally known hydrophilic polyols. For convenience, such polyols, for which the reaction products of the invention can serve as curing agents, are referred to herein as "additional polyols" to distinguish them from those polyols, namely the hydrophobic polyols, which serve as reactants for the organosilicon-containing material for preparation of the reaction products of the invention.

The reaction products of the invention also may be utilized as additives to modify the properties of generally known coating compositions compatible with additive amounts of the reaction products. For example, the reaction products may be incorporated in additive amounts to modify such coating composition properties as rheological properties such as viscosity, surface tension, flow, leveling, etc. An "additive amount" is understood herein to mean an amount of up to about 5 percent by weight based on the weight of resin solids in the coating composition (i.e., excluding pigments and solid fillers).

Moreover, the reaction products of the invention also may be utilized either as a major or minor ingredient of sealant compositions and adhesive compositions.

The following examples illustrate the invention and are not to be construed as limiting it to their details. As used herein, "pbw" means "parts by weight." All parts and percentages in the examples and throughout the specification are by weight unless specifically indicated otherwise.

EXAMPLE 1

(a) Preparation of a Polyester Polyol 5654 pbw of neopentyl glycol and 4186 pbw of hexahydrophthalic anhydride are reacted in a temperature range of from 148° C. to 228° C. in the presence of 0.5 pbw of butyl stannoic acid under a blanket of nitrogen with the distillation and removal of 435 milliliters (ml) of water. The resulting product is a polyester polyol having an acid value of 9.9, a calculated hydroxyl number of about 335, and a calculated hydroxyl equivalent weight of about 167.

(b) Preparation of A Hydrolyzed Organosilicate

A first composition is prepared by dissolving 5 pbw of paratoluenesulfonic acid in 50 pbw of dionized water. With 4 pbw of the first composition is mixed 39.6 pbw of deionized water to form a premix composition.

To a flask equipped with addition funnel, reflux condenser, thermometer, stirrer, and nitrogen inlet is charged 804 pbw of tetraethylorthosilicate and 432.5 pbw of anhydrous ethyl alcohol. Next, 35.04 pbw of the premix composition is added dropwise over a period of 12 minutes while the temperature rises from 23° C. to 31° C. A heating mantle is fixed to the flask and the composition is slowly heated over 103 minutes from 27° C. to 49° C. Thereafter, the composition in the flask is refluxed for 3 hours and 4 minutes at a temperature of 83° C. after which time heating is discontinued and the composition is allowed to stand for 18 hours. Next, the flask is equipped with a distillation column and the composition is slowly heated and maintained in a temperature range of from 81° C. to 110° C. for a total time of 2 hours and 42 minutes while 728 milliliters (ml) of ethanol is distilled off after which heating is discontinued and the flask is allowed to cool over a period of 17 hours and 48 minutes. Next, the composition is heated and maintained in a temperature range of from 110° C. to 197° C. for a period of 2 hours while an additional 42 ml of ethanol is distilled off. The resulting product is a hydrolyzed and condensed organosilicate in which theoretically about 12 percent by weight of the ethoxy groups have been hydrolyzed.

(c) Preparation of Reaction Product from Polyol and Silicon-Containing Material A reaction vessel equipped with heating mantle, steam condenser, packed saddle column, thermometer, stirrer, and nitrogen inlet is charged at room temperature with a reaction mixture containing 251 pbw of the polyester polyol of part (a) above and 550 pbw of the hydrolyzed and condensed organosilicate of part (b) above. The reaction mixture is heated over a period of 1 hour and 20 minutes to a temperature of 174° C. at which point heating is discontinued and the reaction vessel is allowed to cool. During the reaction 90 ml (81 grams) of ethanol is distilled off. The resulting product is a reaction product of the invention having a Gardner-Holdt bubble tube viscosity at 25° C. of 1.1 second (about 50 centipoise). The resulting product also has a calculated content of ethoxy moieties of about 11 milliequivalents per gram of reaction product which corresponds to about 50 percent by weight of ethoxy moieties based on the weight of the reaction product.

(d) Preparation of Chain-Extended Reaction Product 200 pbw of the reaction product is removed from the reaction vessel of part (c) above and to the remaining 520 pbw of reaction product is added 128 pbw of the polyester polyol of part (a) above. The resulting mixture is heated over a period of 1 hour and 30 minutes from room temperature to 187° C. with the distillation and removal of 50 ml (36 grams) of ethanol. Heating is then discontinued and the product is allowed to cool. The resulting product is a reaction product of the invention having a Gardner-Holdt bubble tube viscosity at 25° C. of 38.3 seconds (about 2,700 centipoise) and a total solids content determined at 105° C. over about 2 hours of 81.6 percent by weight. The resulting product also has a calculated content of ethoxy moieties of about 8.2 milliequivalents per gram of reaction product which corresponds to about 36.8 percent by weight of ethoxy moieties based on the weight of the reaction product.

(e) Cured Coatings

To each of the reaction products of parts (c) and (d) above is added 4 percent by weight based on the weight of reaction product of tetraisopropyl titanate to form two catalyzed coating compositions. Each of the catalyzed coating compositions is applied to a steel panel at a wet film thickness of 2 mils ($5 \times 10^{-5}$ meters). The coatings are cured at 250° F. (121° C.) for 30 minutes to produce cured, clear films having good mar resistance. Each of the cured films also withstands over 200 double rubs with methyl isobutyl ketone.

EXAMPLE 2

(a) Preparation of A Hydrolyzed Organosilicate

To a flask equipped with addition funnel, reflux condenser, thermometer, stirrer and nitrogen inlet is charged at room temperature under a blanket of nitrogen, 14,400 pbw of tetraethylorthosilicate followed by the addition of 0.864 pbw of an aqueous 12 normal hydrochloric acid solution (about 35 percent by weight hydrochloric acid). Next, a mixture of 2,880 pbw of ethanol and 482.4 pbw of deionized water is slowly added to the flask with stirring over a period of 45 minutes. Thereafter, stirring of the contents of the flask is continued for an additional 3 hours. The resulting product is a hydrolyzed and condensed organosilicate. The product has a water content of 0.052 percent by weight and a theoretical solids content of 66.6 percent by weight.

(b) Preparation of Reaction Product from Polyol and Silicon-Containing Material A reaction vessel equipped with heating mantle, thermometer, stirrer, and fractional distillation apparatus is charged at room temperature with a reaction mixture containing 45.4 pbw of tris (hydroxyethyl) isocyanurate, 300 pbw of the polyester polyol of Example 1(a) and 892.6 pbw of the hydrolyzed and condensed organosilicate of part (a) immediately above. The reaction mixture is slowly heated over a period of 4 hours and 40 minutes to a temperature of 199° C. at which point heating is discontinued and the reaction vessel is allowed to cool. During the reaction 525 ml of ethanol is distilled off. The resulting product is a reaction product of the invention having a solids content determined at 105° C. for about 2 hours of 73.6 percent by weight, and a Gardner-Holdt bubble tube viscosity at 25° C. of 7.5 seconds (about 550 centipoise). The resulting product has a calculated content of ethoxy moieties of about 9.8 milliequivalents per gram of reaction product which corresponds to about 44 percent by weight of ethoxy moieties based on the weight of the reaction product.

(c) Stability of Catalyzed Coating Composition and Cured Coatings Therefrom

Two catalyzed coating compositions, herein designated $3C_1$ and $3C_2$, are prepared by mixing at room temperature 75 pbw of the reaction product of part (b) immediately above with 1.5 pbw and 2.2 pbw respectively of tetraisopropyl titanate to form coating compositions $3C_1$ and $3C_2$, respectively. Each of the compositions is allowed to stand for 1 hour and any changes in appearance are noted. After the 1 hour, composition $3C_1$ appears clear and composition $3C_2$ appears slightly cloudy.

After the 1 hour period described above, each of compositions $3C_1$ and $3C_2$ is applied to a steel panel at a wet film thickness of 2 mils ($5 \times 10^{-5}$ meters). The coatings are allowed to stand at room temperature for 30 minutes and thereafter cured at 250° F. (121° C.) for 30 minutes. Each of the cured coatings is tested for solvent resistance according to the procedure described below utilizing both ethanol and methyl ethyl ketone and also for pencil hardness. Solvent resistance is indicated by the number of "double rubs" with the indicated solvent that the cured films can withstand before the film is dissolved. Double rubs as used herein are understood to mean the number of back and forth finger rubs across the cured film with cheesecloth dipped in the solvent indicated.

TABLE 1

| Composition | Pencil Hardness | Double Rubs/ Methylethyl Ketone | Double Rubs/ Ethanol |
|---|---|---|---|
| $3C_1$ | 2H | 240 | >300 |
| $3C_2$ | 3H | >300 | >300 |

EXAMPLES 3-4

(a) Reaction vessels 1 and 2 are charged with the materials in the amounts set forth in the following TABLE 2. The reaction vessels and contents are heated over a period of 30 minutes to a temperature of 85° C. to produce homogeneous reaction products.

TABLE 2

| Reaction Vessel | 1 | 2 |
|---|---|---|
| DOW-565* (grams) | 5 | 10 |
| SILBOND-40 (grams) | 45 | 40 |

*Primarily 2,2-bis (2-hydroxypropoxyphenyl) propane available from DOW CORNING Corporation.
**A hydrolyzed and condensed tetraethoxysilane having an ethoxy content of about 65 percent by weight (corresponding to about 15.6 milliequivalents of ethoxy groups) and a silicon content of 8 percent by weight available from Stauffer Chemical Company.

(b) Each of the reaction vessels 1 and 2 containing reaction products 1 and 2, respectively, is placed for 1 hour in an oven at 300° F. (149° C.). After this period, the reaction products are observed to see if they have gelled. Neither of the reaction products gelled.

Although the specific three-step gel test as described previously was not performed on the reaction products of part (a) immediately above, it is submitted that neither of the reaction products 1 and 2 would gel when subjected to the specific three-step gel test.

What is claimed is:

1. A liquid composition comprising a reaction product prepared by reacting:
   (A) at least one hydrophobic polyol; and
   (B) an organosilicon-containing material comprising
      (1) at least one organosilicon-containing substance free of functional groups attached to carbon and essentially free of alkali metal ions, having atoms bonded directly to Si, all of said atoms being selected from O, N, and/or Cl, said organosilicon-containing substance additionally having moieties directly bonded to Si which are displaceable by reaction with water and/or alcohol, wherein at least a part of said organosilicon-containing substance is hydrolyzed to a compound or a mixture of compounds, said compound or mixture of compounds containing a residual amount of said moieties directly bonded to Si which are displaceable;
      (2) optionally a nonfunctional organosilane, a hydrolyzed nonfunctional organosilane, or a mixture thereof; and
      (3) optionally a functional organosilane, a hydrolyzed functional organosilane, or a mixture thereof;
wherein said reaction product has a ratio of milliequivalents of said residual moieties which are displaceable to milliequivalents of hydroxyl moieties from said polyol greater than 1, is capable of self curing to a continuous film in the presence of moisture, and remains ungelled when subjected to a three-step gel test consisting of (1) heating a 10 gram sample of said reaction product in a glass jar covered with a cap at 149° C. for 120 minutes, followed by (2) heating said sample at 149° C. for 120 minutes, in the presence of 0.5 grams of stannous octoate in said glass jar with a vent hole covered by a piece of masking tape in said cap, followed by (3) repeating step 2 except that no additional stannous octoate is introduced into said sample and said heating is conducted at a temperature of 204° C.

2. The composition of claim 1 wherein said moities directly bonded to Si which are displaceable by reaction with water or alcohol are selected from the group consisting of $$-OR^1, -O-\overset{O}{\underset{\|}{C}}-R^2, -\overset{H}{\underset{|}{N}}-\overset{O}{\underset{\|}{C}}-R^2, -O-N=\overset{R^3}{\underset{|}{C}}-R^4,$$

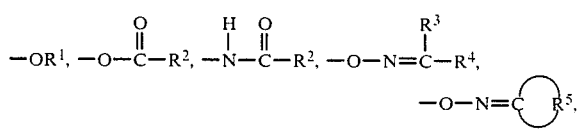

and the $C_2$ to $C_3$ residue of a 1,2- or 1,3-glycol, wherein
$R^1$ represents $C_1-C_7$ alkyl, $C_6-C_8$ cycloalkyl, $C_6-C_8$ aryl, or $C_3-C_8$ alkoxyalkyl,
$R^2$ represents H or $C_1-C_4$ alkyl,
$R^3$ and $R^4$ independently represent $C_1-C_4$ alkyl, $C_6-C_8$ cycloalkyl, or $C_6-C_8$ aryl, and
$R^5$ represents $C_4-C_7$ alkylene.

3. The composition of claim 1 wherein said reaction product has a content of said residual moieties which are displaceable ranging from 20 milliequivalents per gram to 1.5 milliequivalents per grams of said reaction product.

4. The composition of claim 1 wherein all atoms directly bonded to Si of said organosilicon-containing substance are oxygen atoms.

5. The composition of claim 1 wherein said moieties directly bonded to Si which are displaceable by reaction with water and/or alcohol are lower alkoxy moieties selected from the group consisting of methoxy, ethoxy and propoxy.

6. The composition of claim 3 wherein said reaction product has a content of hydroxyl moieties from said polyol ranging from 0 milliequivalents per gram to 6 milliequivalents per gram of said reaction product.

7. The composition of claim 1 wherein said hydrophobic polyol has a hydroxyl equivalent weight of from 45 to 1000.

8. The composition of claim 1 wherein said organosilicon-containing material comprises from 50 to 100 percent by weight, based on the total weight of said organosilicon-containing material, of said organosilicon-containing substance at least a portion of which is hydrolyzed.

9. The composition of claim 1 wherein said hydrophobic polyol is selected from the group consisting of simple diols, triols, and higher hydric alcohols; polyester polyols; polyether polyols; amide-containing polyols; and polyurethane polyols.

10. The composition of claim 1 having a viscosity at room temperature of from about 50 centipoise absent any added solvent to about 5,000 centipoise in admixture with up to 20 percent by weight, based on the weight of the composition, of solvent.

11. The composition of claim 1 wherein said organosilicon-containing material comprises from greater than 2 to less than 80 percent by weight based on the total weight of said organosilicon-containing material of a nonfunctional organosilane, a hydrolyzed nonfunctional organosilane, or a mixture thereof, and, optionally from greater than 2 to less than 50 percent by weight based on the total weight of said organosilicon-containing material of a functional organosilane, a hydrolyzed functional organosilane, and a mixture thereof.

12. The composition of claim 11 wherein said organosilicon-containing material comprises a hydrolyzed mixture of at least a part of said organosilicon-containing substance; at least a part of said nonfunctional organosilane, hydrolyzed nonfunctional organosilane, or mixture thereof; and optionally at least a part of said functional organosilane, hydrolyzed functional organosilane, or mixture thereof.

13. The composition of claim 5 which is capable of being self-cured within about 30 minutes at a temperature of less than or equal to 121 degrees Celsius (250 degrees Fahrenheit).

14. The composition of claim 1 wherein said hydrophobic polyol contains nonvicinal hydroxyl groups.

15. The composition of claim 1 wherein said said hydrophobic polyol has a hydroxyl equivalent weight of from 59 to 600.

16. The composition of claim 1 comprising in addition to said reaction product an additional polyol.

17. The composition of claim 16 wherein said additional polyol comprises a hydrophobic polyol.

18. An improved coating composition the improvement comprising: the inclusion in said coating composition of an additive amount of a reaction product prepared by reacting
   (A) at least one hydrophobic polyol, and
   (B) an organosilicon-containing material comprising
      (1) at least one organosilicon-containing substance free of functional groups attached to carbon and essentially free of alkali metal ions, having atoms bonded directly to Si, all of said atoms being selected from O, N, and/or Cl, said organosilicon-containing substance additionally having moieties directly bonded to Si which are displaceable by reaction with water and/or alcohol, wherein at least a part of said organosilicon-containing substance is hydrolyzed to a compound or a mixture of compounds, said compound or mixture of compounds containing a residual amount of said moieties directly bonded to Si which are displaceable, (2) optionally a nonfunctional organosilane, a hydrolyzed nonfunctional organosilane, or a mixture thereof, and (3) optionally a functional organosilane, a hydrolyzed functional organosilane, or a mixture thereof wherein said reaction product has a ratio of milliequivalents of said residual moieties which are displaceable to milliequivalents of hydroxyl moieties from said polyol greater than 1, is capable of self curing to a continuous film in the presence of moisture, and remains ungelled when subject to a three-step gel test consisting of (1) heating a 10 gram sample of said reaction product in a glass jar covered with a cap at 149° C. for 120 minutes in the presence of 0.5 grams of stannous octoate in said glass jar with a vent hole covered by a piece of masking tape in said cap, followed by (3) repeating step 2 except that no additional stannous octoate is introduced into said sample and said heating is conducted at a temperature of 204° C.

* * * * *